United States Patent [19]

Wilson

[11] 4,314,689
[45] Feb. 9, 1982

[54] DRAIN VALVE

[75] Inventor: Michael E. Wilson, Modesto, Calif.

[73] Assignee: Racor Industries, Inc., Modesto, Calif.

[21] Appl. No.: 105,095

[22] Filed: Dec. 19, 1979

[51] Int. Cl.³ .......................................... F16K 31/58
[52] U.S. Cl. .................... 251/351; 251/353; 251/144
[58] Field of Search ................... 251/351, 353, 144

[56] References Cited

U.S. PATENT DOCUMENTS

| 247,668 | 9/1881 | Loftus | 251/353 X |
| 971,361 | 9/1910 | Dennis | 251/351 |
| 2,823,699 | 2/1958 | Willis | 251/351 X |
| 3,103,341 | 9/1963 | Moran | 251/351 X |
| 3,184,091 | 5/1965 | Hoffman | 251/351 X |

FOREIGN PATENT DOCUMENTS

| 1195965 | 5/1959 | France | 251/351 |
| 494611 | 5/1954 | Italy | 251/351 |

Primary Examiner—William R. Cline

[57] ABSTRACT

A drain valve for handling contaminated fluids includes a body having a drain port and an internal passage communicating therewith. A plug is disposed in the internal passage and the plug defines a drain passage which communicates with the internal passage. Further, the drain valve includes an actuating device for selectively positioning the plug to a drain port opening position and to a drain port closing position, and a device for preventing contamination of the actuation device. Accordingly, contaminates are prevented from reaching the actuating device and reducing the efficiency of the drain valve. The drain valve also includes a seal located above the drain port. The plug sealingly engages the seal in the drain port closing position. With the seal located above the drain port, contaminates in the fluid are unable to collect thereon and thus do not abrade the seal as the plug is actuated into the drain port closing position.

1 Claim, 4 Drawing Figures

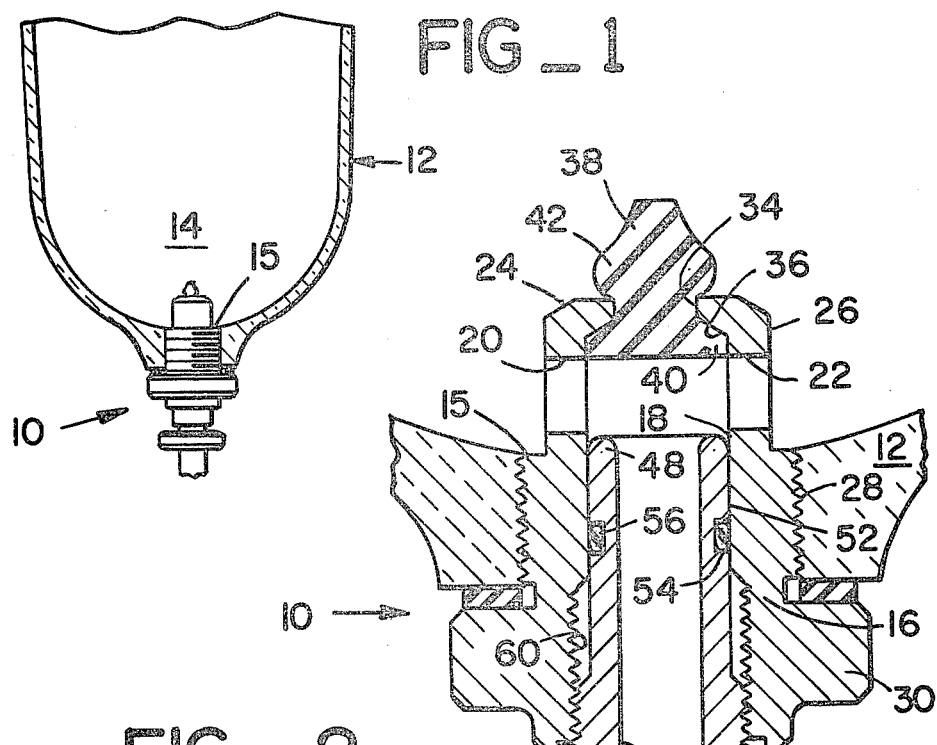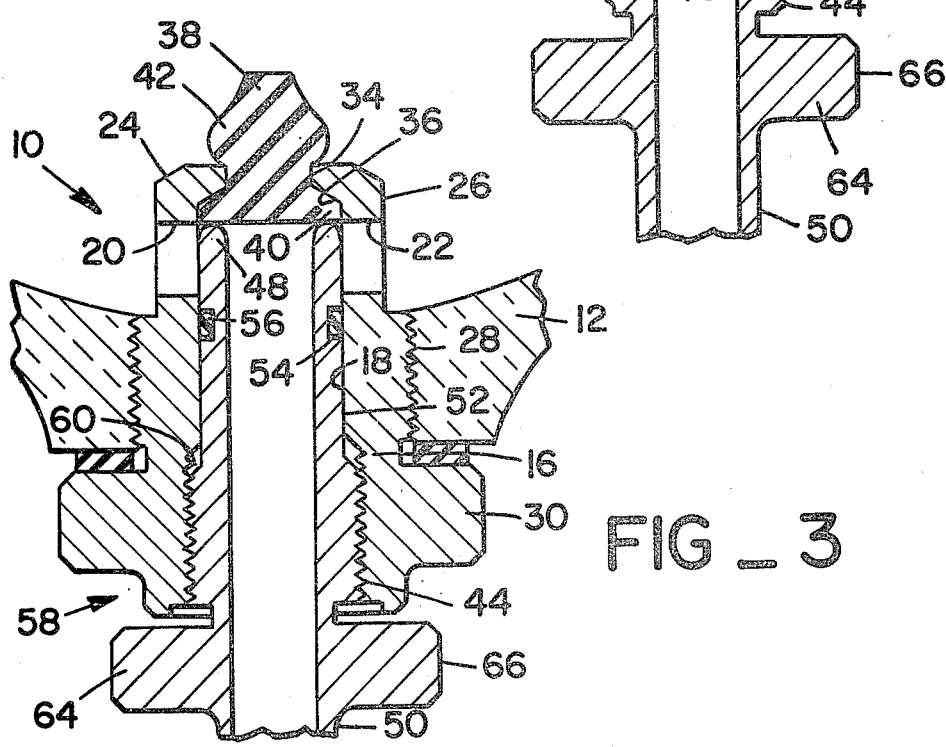

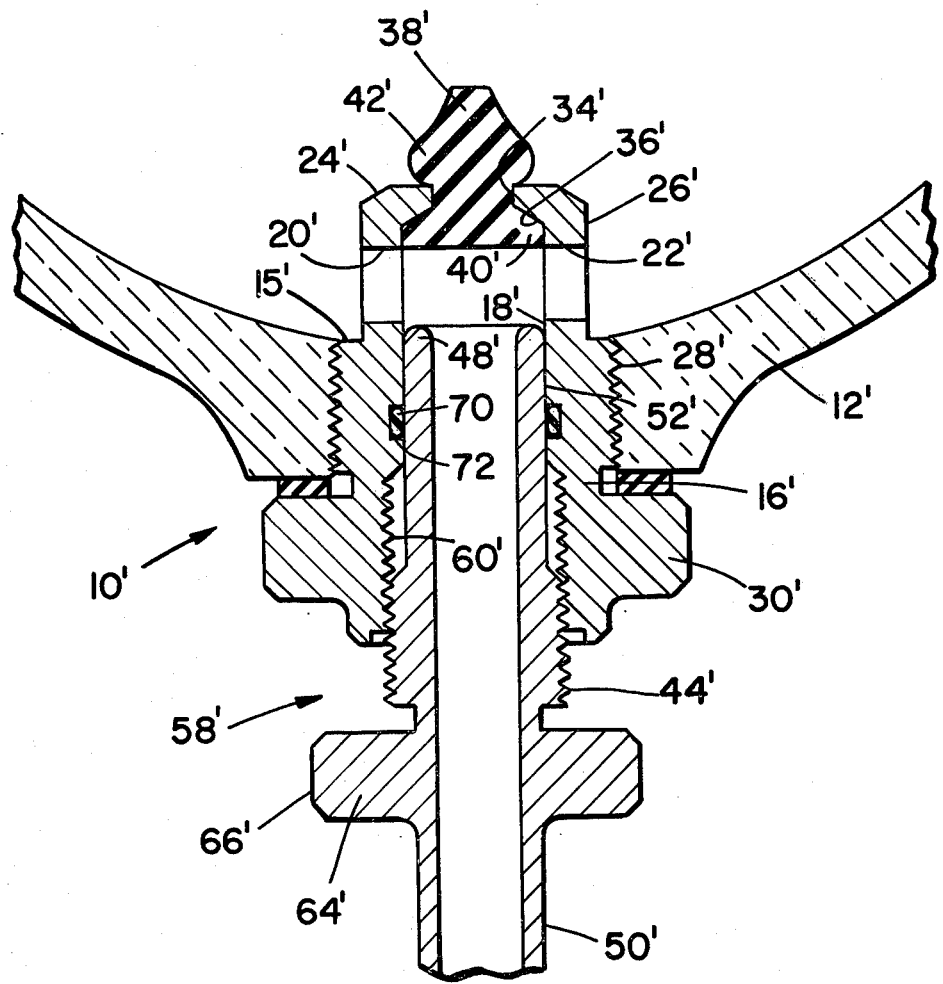
FIG_4

4,314,689

DRAIN VALVE

TECHNICAL FIELD

The present invention concerns drain valves, and in particular, drain valves for handling contaminated fluids.

Background Art

The prior art is comprised of a multitude of drain valves, faucets, drain cocks and the like for allowing fluid to be selectively released from a source thereof. Two such valves are disclosed in U.S. Pat. No. 247,668 issued on Sept. 27, 1881 to T. J. Loftus and U.S. Pat. No. 3,184,091 issued on May 18, 1965 to A. J. Hoffman. Both of the above devices include an outer cylindrical housing having a discharge port provided radially therethrough and an inner passage communicating with such port. The inner passage receives a plug defining a drain passage which communicates with the inner passage. The plug can be positioned relative to the body by actuation means which include screw threads. The body of the valve is positioned in the source of fluid so that the drain port communicates with the fluid. The plug has a drain port closing position wherein the plug is positioned with respect to the body to block the drain port. Further, the plug has a drain port opening position wherein the drain plug is positioned with respect to the body to allow fluid to flow through the drain port, the internal passage and the drain passage to drain the source. In both above disclosures, the end of the plug positioned adjacent the drain port is open allowing the aforementioned communication between the internal passage and the drain passage. Further, in the Hoffman reference, a seating gasket is provided in the end of the body, against which the open end of the plug sealingly contacts with the plug in the drain port closing position.

The above references have several disadvantages that make them inappropriate for draining fluids containing contaminates, which contaminants are detrimental to the continued efficient operation of the valve. In particular, these drain valves allow the drained fluid and any contaminates including particles entrained and flowing therewith to contaminate and eventually reduce the efficiency of the actuation means by allowing the contaminates to seep between the body and the plug and eventually reach the actuation means. Were such a plug used to drain fluids containing metallic particle, it is possible for such metallic particle to lodge themselves in the thread mechanism of the actuation means and reduce the efficiency of the actuation means by gouging or jamming the threads. Consequently, there is a need to provide an efficient and low cost drain valve which can be mass produced and which can tolerate contaminated fluids such as may be found in the residue from a fuel filter or the oil in a crank case.

Another problem associated with the above valves, especially in the case of the Hoffman reference, is that the contaminates can collect on the seating gasket and adjacent the end of the plug so that when the plug is actuated into seating contact with the gasket, the contaminates can displace and abrade away the gasket reducing the effectiveness thereof. Accordingly, there is a need to provide a drain valve wherein such contaminates do not collect on the gasket or adjacent the end of the plug as the contaminated fluid is drained through the drain valve.

The present invention is directed to overcoming one or more of the problems as set forth above.

Disclosure of the Invention

The present invention includes a drain valve including a body having a drain port and an internal passage provided in communication therewith. The drain valve further includes a plug which is disposed in the internal passage and has a drain passage which communicates with such internal passage. Further means are provided for actuating the plug selectively either to a drain port closing position or to a drain port opening position. The drain valve further includes means for preventing contamination of the actuation means.

In one aspect of the invention the contamination preventing means is mounted on the plug so as to be spaced from the drain port with the plug in the drain port closing position and also spaced from the actuating means with the plug in the drain port opening position.

In another aspect of the invention the contamination preventing means is mounted on the internal passage between the drain port and the actuation means. With the above arrangements, contaminates in the fluid being discharged are prevented from contacting the actuation means and thus from decreasing the efficiency of the valve.

In yet another aspect of the invention, the drain valve for a vessel is mounted beneath at least a portion of said vessel and includes a body having a drain port communicating with said vessel, a seal mounted above said drain port and an internal passage communicating with said drain port. A plug is disposed in said internal passage and has a drain passage which communicates with said internal passage. Further means are provided for actuating said plug selectively upwardly into contact with said seal to a drain port closing position and downwardly to a drain port opening position. Further means are provided for preventing contamination of said actuation means. With such an arrangement, the fluid containing contaminates generally flows beneath said seal and thus contaiminates do not have a chance to settle thereon. Further the influences of gravity and the flow rate of the discharging fluid, should it contact the seal, would assist in preventing contaminates from building up thereon. Thus, when the plug is actuated into the port closing position and urged into sealing engagement with the seal, there would be little or no collected contaminates to cause gouging and degradation of said seal.

BRIEF DESCRIPTION OF THE DRAWINGS

FIG. 1 is a partially sectioned and partially cut away side view of a vessel having the drain valve of the invention mounted thereto.

FIG. 2 is a sectioned, side elevational view of the drain valve of FIG. 1 mounted through a port of said vessel with said valve in the drain port opening position.

FIG. 3 is a sectioned, elevational view of the drain valve of the invention of FIG. 1 mounted through a port of said vessel with the drain valve in a drain port closing position.

FIG. 4 is a partially sectioned and partially cut away side elevational view of an alternate embodiment of the invention.

BEST MODE OF CARRYING OUT THE INVENTION

With reference to the figures, and in particular to FIG. 1, the drain valve 10 of the invention is depicted mounted through port 15 at the lower most portion of a bowl 12 of, for example, a diesel fuel filter. Water and other contaminates, including particles which can be found in a diesel fuel system, collect in area 14 and can be selectively drained therefrom by drain valve 10 as described herein below. Accordingly, drain valve 10 must operate in a contaiminated environment and must maintain its efficiency for an extended period so that, for example, in this case diesel fuel does not inadvertently leak from filter 12.

Turning to FIG. 2, the drain valve 10 includes a cylindrical body 16 which defines an axial internal passage 18. Body 16 further defines two radial drain ports 20 and 22 adjacent its upper end 24. Radial drain ports 20 and 22 are substantially perpendicular to axial internal passage 18 and are provided through the external cylindrical surface 26 of body 16.

Immediately below radial drain ports 20 and 22, cylindrical surface 26 defines an external thread 28 which accomodates an internal thread located in port 15 of filter bowl 12. Body 16 also includes an annular flange 30 located immediately below external thread 28. Through the rotation of flange 30, and thus body 16, clockwise or counterclockwise, drain valve 10 can be inserted or removed, respectively, from port 15.

An aperture 34 is provided axially through upper end 24 of body 16. Aperture 34 is located above radial drain ports 20 and 22 as depicted in FIG. 2. As can be seen in FIG. 2, the diameter of aperture 34 is less than the diameter of the axial internal passage 18, which reduction is accomplished by a beveled shoulder 36 defined by body 16. Disposed through aperture 34 is a seal which in a preferred embodiment can be comprised of an elastomeric or plastic material. Seal 38 is substantially symmetrical about its longitudinal axis and includes a lower flange portion 40 spaced from an upper bulbous flange portion 42. Seal 38 is disposed through aperture 34 such that lower flange portionn 40 seals against beveled shoulder 36 and upper bulbous flange 42 seats against the external upper end 24 of body 16. Accordingly the flanges 40 and 42 retain the seal 38 in position through the aperture 34.

Disposed in the axial internal passage 18 of body 16 is a plug 44. Plug 44 is elongate and defines an axial drain passage 46, which is open at its upper end 48 to communicate with internal passage 18 of body 16. The lower end 50 of plug 44 is also open and may be adapted for mounting a discharge hose (not shown). Spaced from upper end 48, the external cylindrical surface 52 of plug 44 defines a peripheral groove 54 which accepts a contamination prevention means such as an O-ring 56 or the like. O-ring 56 can be comprised of elastomeric or plastic material or the like. O-ring 56 provides a seal between plug 44 and axial passage 18.

Body 16 and plug 44 define actuation means 58 which includes an internal thread 60 defined by axial internal passage 18 immediately adjacent flange 30 of body 16 and an external thread 62 which accomodates internal thread 60 and is defined by plug 44 and located below peripheral groove 54. Actuation means 58 further includes an annular flange 64 which extends from plug 44. The rotation of annular flange 64 can cause the plug 44 to move upwardly or downwardly in internal passage 18 of body 16. The peripheral surface 66 of flange 64 can be knurled in a preferred embodiment to prevent slipage should a film of grease and the like accumulate thereon.

The operation of the drain valve 10 is as follows. With plug 44 in the drain port opening position as depicted in FIG. 2, fluid can flow from bowl 12 through drain ports 20 and 22 into internal passage 18 of body 16 and finally through the drain passage 46 of plug 44. It is to be remembered that, since seal 38 is positioned above drain ports 20 and 22, contaminates in the fluid cannot collect on seal 38. Further, should contaminates come in contact with seal 38, the flow rate of the fluid through ports 20 and 22 would be great enough to clean the contaminates and other particles from said seal. Also as the fluid drains through ports 20 and 22 it drains over the end 48 of plug 44 cleaning said end and not allowing particles to collect thereon. It is to be noted that O-ring 56 prevents any fluid and/or contaminates from seeping therepast and between the plug 44 and the axial internal passage 18 so as to contaiminate the actuating means 58. It is noted that, with the plug 44 in the drain port opening position, O-ring 56 does not contact the internal and external threads 60 and 62 of the actuating means 58, and thus any contaminants which can accumulate at O-ring 56 do not contact these threads.

In order to stop the flow of fluid and contaminates through valve 10, flange 66 is turned causing external thread 62 located on plug 44 to move upwardly on internal thread 60 located on axial internal passage 18. As is depicted in FIG. 3 the actuating means 58 can move the upper end 48 of plug 44 into sealing engagement with seal 38. This arrangement simultaneously causes the upper end of said plug 44 to block drain ports 20 and 22 thereby preventing flow from filter bowl 12. As no contaminates, remain on seal 38 or on the upper end 48 of plug 44, there is no wearing of said seal 38 by the abrasion of said particles as the upper end 48 comes into sealing engagement with said seal 38. It is noted in FIG. 3 that O-ring 56, with the plug 44 in the drain port closing position, is located out of contact with said drain ports 20 and 22 and thus does not allow contaminates to flow between body 16 and plug 44. Accordingly the actuation means 58 moves the O-ring 56 between and without contacting said drain ports 20 and 22 and said actuating means 58. Stated another way, the distance between the O-ring 56 and said actuating means 58 when the plug is in drain port closing position is greater than the length of travel of said plug 44 to drain port opening position. With the contamination preventing means or O-ring 56 so positioned, contaminates and particularly solid particles in the fluid being drained are prevented from reaching the actuating means 58 and thus the contaminates cannot interfere with the efficient operation of said actuating means 58.

An alternative embodiment of the drain valve is depicted in FIG. 4. Elements of the drain valve of FIG. 4 which correspond to those of FIGS. 1 through 3 are given like primed numbers. Drain valve 10' of FIG. 4 includes a contamination preventing means or O-ring 70, which can be comprised of the same materials of which O-ring 56 is comprised. O-ring 70 is mounted in a peripheral groove 72 defined by the axial internal passage 18'. As can be seen in FIG. 4, O-ring 70 is located between drain ports 20' and 22' and the internal thread 60' defined by body 16. With plug 44' in either of the drain port opening or closing positions as shown in FIGS. 2 and 3 respectively, the O-ring 70 provides a seal between axial internal passage 18' and plug 44' in order to prevent contaminates and in particular solid particles from reaching actuating means 58'.

Other aspects, objects, and advantages of this invention can be obtained from a study of the drawings, the disclosure and appended claims.

I claim:

1. A drain valve adapted for insertion into a port of a source of fluid to be drained comprising:

a substantially cylindrical body having:

(4) a groove defined about the external surface of said plug between said one end of said plug and said external thread;

a seal means for preventing contamination of said internal thread of said body and said external thread of said plug, said seal means disposed in said groove, wherein said seal means moves with said plug between and without contacting said drain port, and said internal thread of said body as said plug is actuated selectively to a drain port closing position and to a drain port opening position.

* * * * *

UNITED STATES PATENT AND TRADEMARK OFFICE
CERTIFICATE OF CORRECTION

PATENT NO. : 4,314,689

DATED : February 9, 1982

INVENTOR(S) : Michael E. Wilson

It is certified that error appears in the above—identified patent and that said Letters Patent is hereby corrected as shown below:

Column 5, last line, after "having:" insert --

(1) a drain port adjacent one end thereof;
    (2) an internal passage provided in communication with said drain port;
    (3) an aperture provided through said one end of said body adjacent said drain port;
    (4) a flange adjacent the other end of said body;
    (5) an external thread located between said flange and said drain port, said thread adapted to be received in the port of the source of fluid from the outside of said source with said drain port extending into said source;
    (6) an internal thread located between said flange and said drain port;
    a seal impressed into the aperture adjacent said drain port;
    a substantially cylindrical plug which is disposed in said internal passage, which plug defines:
        (1) a drain passage which communicates with said internal passage;
        (2) an external thread spaced from one end of said plug, which end is located adjacent said drain port;
        (3) a flange located between said external thread of

UNITED STATES PATENT AND TRADEMARK OFFICE
CERTIFICATE OF CORRECTION

PATENT NO. : 4,314,689

DATED : February 9, 1982

INVENTOR(S) : Michael E. Wilson

It is certified that error appears in the above—identified patent and that said Letters Patent is hereby corrected as shown below:

said plug and the other end of the said plug, said flange, said external thread of said plug and said internal thread of said body providing means for actuating said plug selectively to a drain port closing position and to a drain port opening position;--

Signed and Sealed this

Thirty-first Day of May 1983

[SEAL]

Attest:

DONALD J. QUIGG

Attesting Officer

Acting Commissioner of Patents and Trademarks